US005078029A

United States Patent [19]
Boggs et al.

[11] Patent Number: 5,078,029
[45] Date of Patent: Jan. 7, 1992

[54] FACE AND TOP GRINDER

[75] Inventors: W. Paul Boggs, Gladstone; Kenneth B. Swiger, Hillsboro; Carroll E. Sizemore, Portland, all of Oreg.

[73] Assignee: Cascade/Southern Saw Corporation, Milwaukie, Oreg.

[21] Appl. No.: 587,248

[22] Filed: Sep. 24, 1990

[51] Int. Cl.⁵ .............................. B23D 63/14
[52] U.S. Cl. .............................. 76/77; 76/41
[58] Field of Search .......... 76/37, 41, 40, 42, 43, 76/75, 77

[56] References Cited

U.S. PATENT DOCUMENTS

| | | | |
|---|---|---|---|
| 4,136,585 | 1/1979 | Lenard | 76/40 |
| 4,488,458 | 12/1984 | Beck et al. | 76/37 |
| 4,677,882 | 7/1987 | Beck et al. | 76/77 |
| 4,750,387 | 6/1988 | Swiger | 76/37 |

OTHER PUBLICATIONS

Product brochure, Original Vollmer, CHC2OH-CHC26H, Automatic Machine for Face and Top Grinding and Relieving the Blade Material of TCT Circular Saws, 3/87, Vollmer Werke Maschinenfabrick GmbH.

Primary Examiner—Roscoe V. Parker
Attorney, Agent, or Firm—Marger, Johnson, McCollom & Stolowitz Inc.

[57] ABSTRACT

A grinding machine for sharpening toothed saws includes a saw blade holder for rotatably holding a saw. A pneumatic or hydraulic ram drives a cam back and forth in one of a number of preselected grooves in a rotatable cam plate for driving a pawl in an arcuate path for rotating the saw blade. Each saw tooth is thus advanced, one tooth at a time, through a grinding position in which a rotating grindstone sharpens the face or top of the saw tooth. The position of the grinder head arm is adjustable through an arc of about 105° to permit top and face grinding without turning over the grindstone or the spindle arm on which the grindstone is mounted. The head arm is tiltably mounted on a heavy plate and releasably secured to the periphery of the plate for stability.

26 Claims, 7 Drawing Sheets

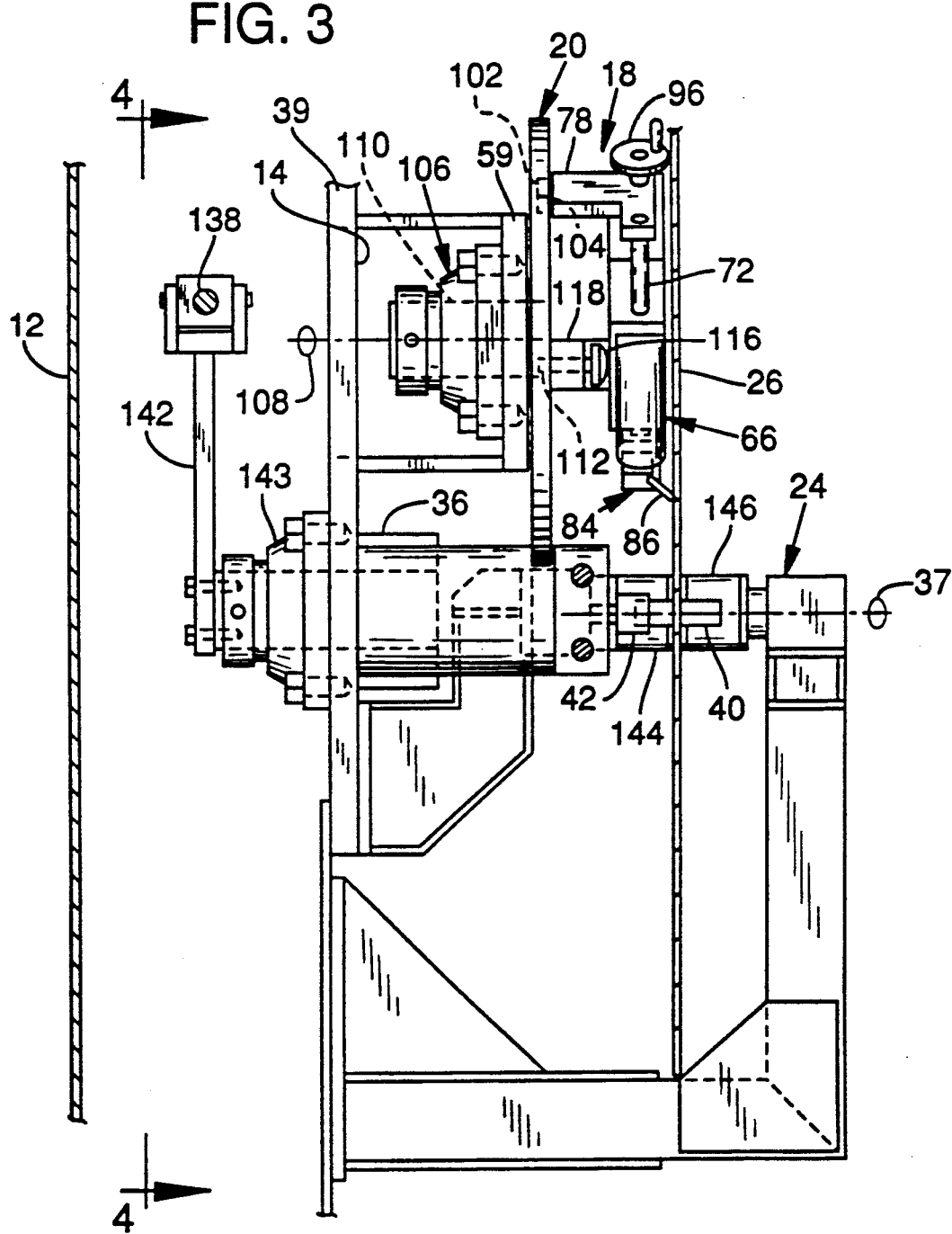

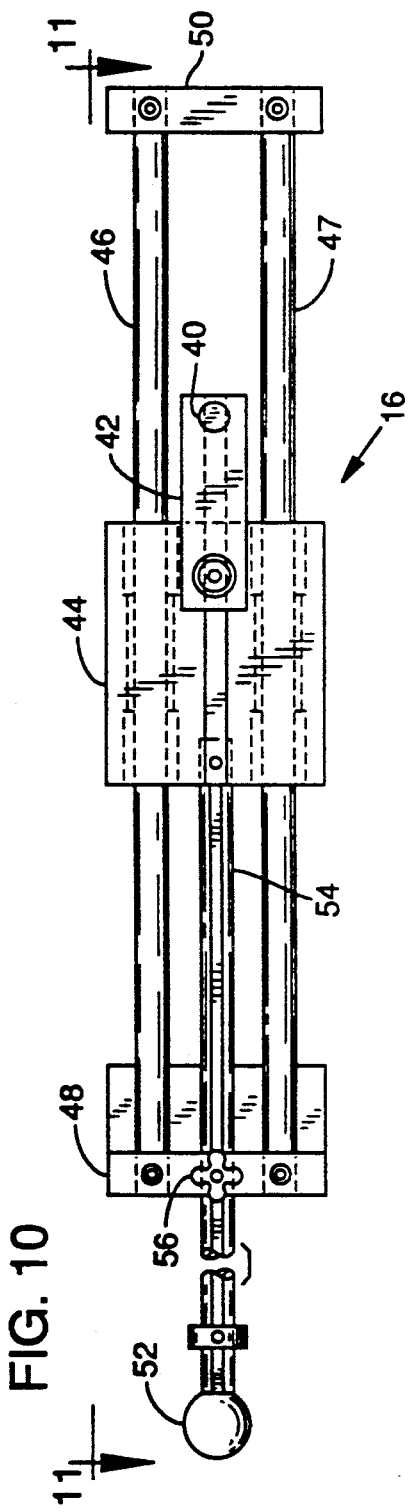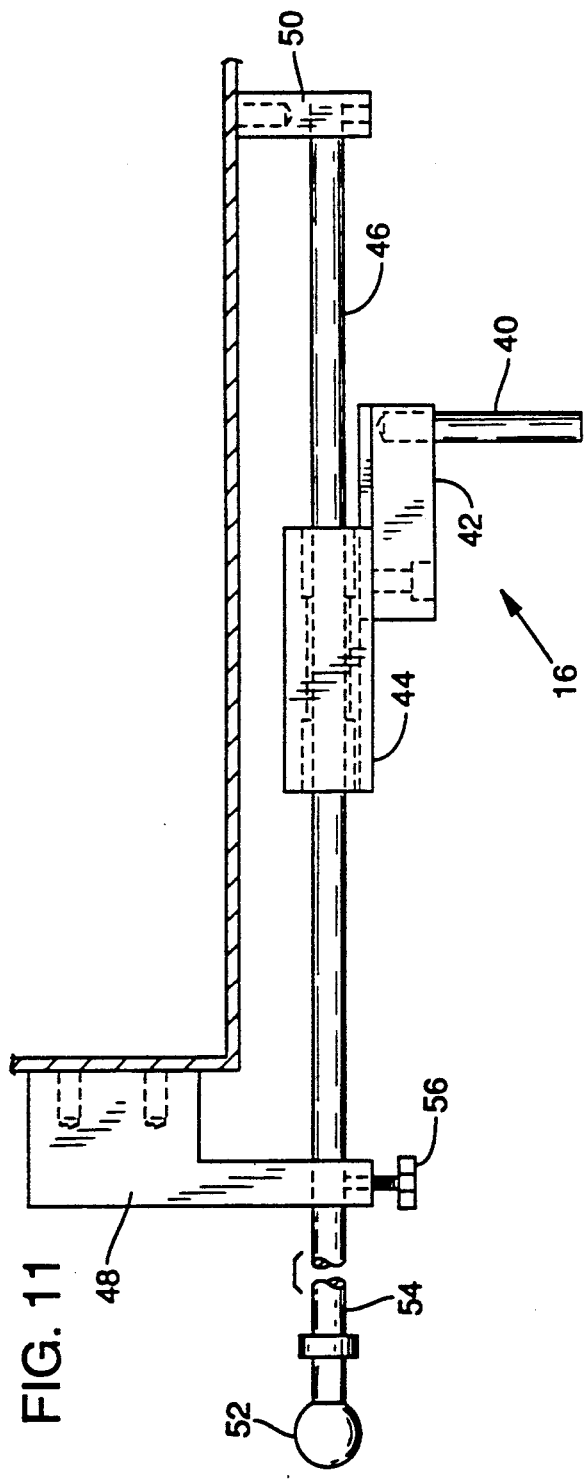

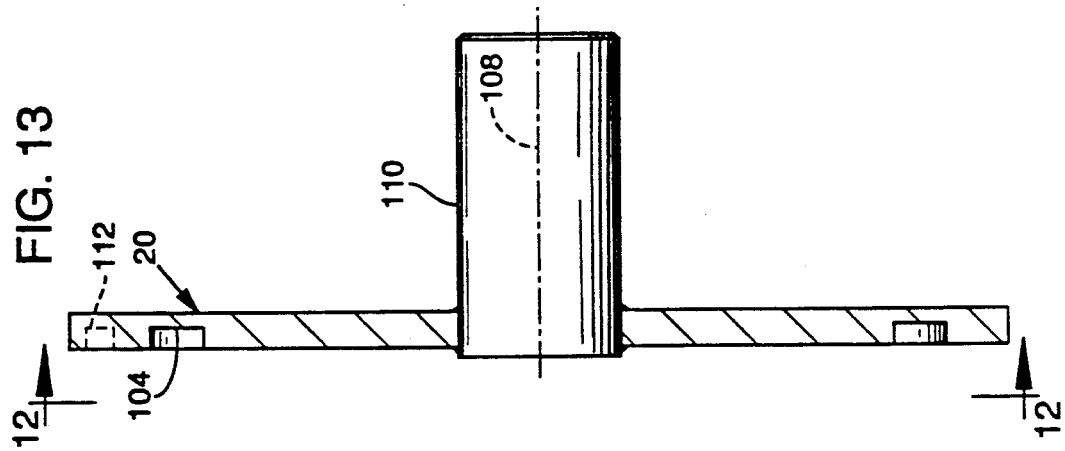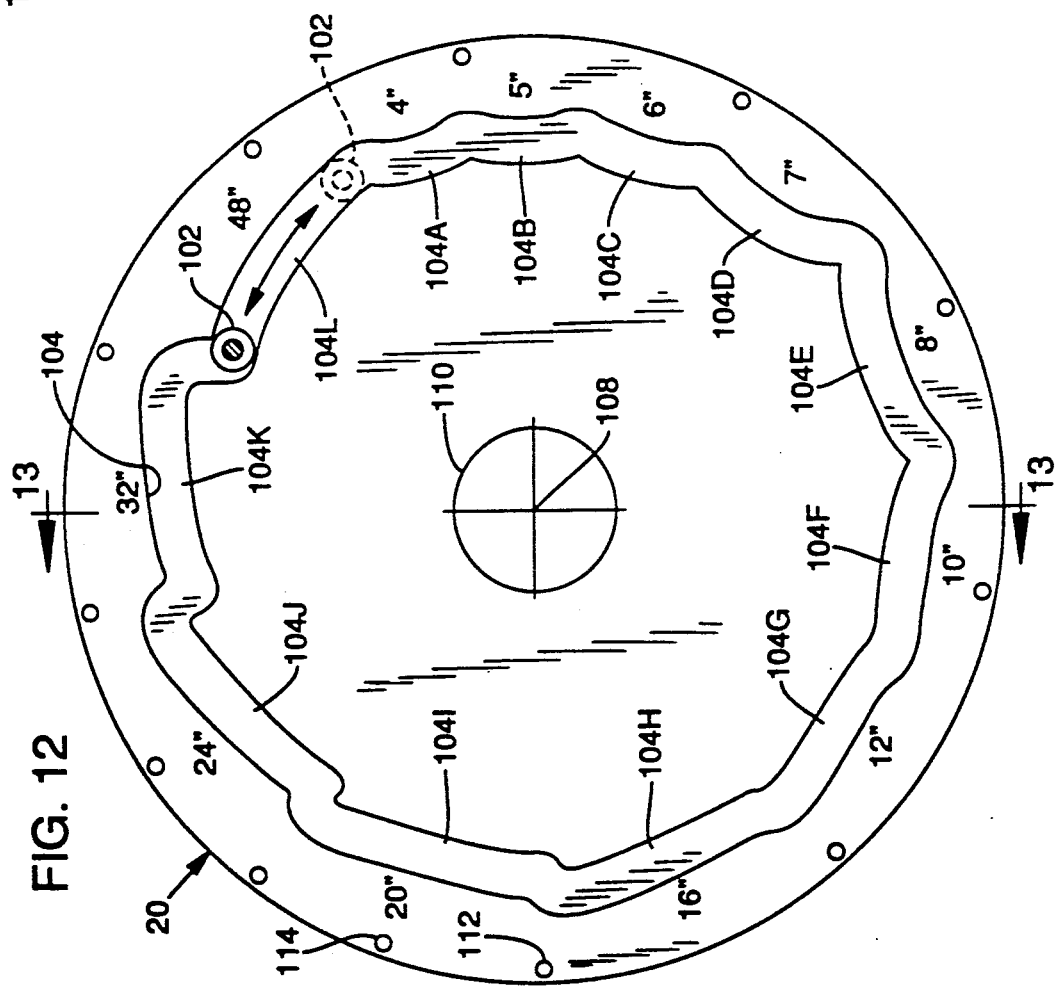

FACE AND TOP GRINDER

BACKGROUND OF THE INVENTION

1. Field of the Invention

The present invention relates to machines that grind saw blades, and more particularly to such machines that automatically grind the top and face of each tooth of a circular saw blade.

2. Description of the Related Art

Circular saw blades are conventionally ground by systems including various types of circular grinding wheels to grind the saw blade teeth. The critical parameter in grinding a saw blade is "precise replication." All of the saw teeth in a given saw blade must be precisely ground to a similar configuration which is uniform within extremely narrow tolerances.

Various automatic machines for grinding saw blades have been proposed for the purpose of precise grinding replication results. One such automatic machine is disclosed in U.S. Pat. No. 4,750,387 to Swiger, assigned to Cascade/Southern Saw Corp. This patent discloses a saw grinding machine for grinding the sides of teeth, not the top and face of the teeth, but it shares many of the same problems as a top and face grinder.

Top and face grinding machines employ automatic indexers to advance the circular saw blade a predetermined distance to grind each tooth in turn. Such indexers have to adapt to a plurality of saw blades having widely varying tooth spacings and diameters. As a saw blade is rotated, a tooth on the outside radius of a large diameter saw blade travels along a different arcuate path than does a tooth on a small diameter saw blade. Ideally, the part of an indexer that engages the tooth on a saw blade, i.e., a pawl, should advance along the same circumferential path as the tooth. Thus, an indexer must be adaptable to accommodate a different path for each circular saw blade having a different diameter, as well as a different path length for blades of different diameters and tooth spacings.

Saw sharpening machines known in the prior art automatically index circular saw blade teeth. Indexers employed in such machines, however, have serious drawbacks. For example, in the Vollmer Werke Maschinenfabrick GmbH (Vollmer) commercial top and face circular saw grinder, Model CHC, the indexer is hydraulically operated with one hydraulic drive that reciprocally moves a pawl from a first retracted position to a second extended position. The indexer is pivotally mounted so that the pawl travels in an arcuate path responsive to a cam follower that moves relative to a cam surface. A feed curve inset block providing a specific cam surface is employed in conjunction with a saw blade having a specific diameter. This system is effective, but when a saw blade of different diameter is to be ground, a different feed curve inset block suited for that specific diameter must be installed. Installing a different cam for each change to a saw blade having a different diameter requires time and labor of an operator. The machine must be shut down during this change of cams, so the system is very inefficient.

In view of the foregoing problem, other solutions to indexing circular saw blades have been proposed. One such solution is disclosed in U.S. Pat. No. 4,488,458 to Beck, assigned to Vollmer. The Beck indexer requires the coordination of two complex mechanical systems to achieve the desired results of having a pawl move in an arcuate path defined by a tooth on a rotating circular saw. Beck employs two controllable linear drive means: one drive means pivots the indexer while the other extends the pawl. Because Beck requires two drive means that must simultaneously work in unison, however, it is unnecessarily complex in its design and control. This, in turn, creates problems with precise alignment and precise replication as well as problems with maintenance.

Beyond the problems noted above, to be fully useful, automatic top and face grinding machines must be able to grind the face of saw teeth having either positive or negative rake angle. Although some grinding machines are so designed, they generally require the operator to reconfigure the machine to change from a positive to a negative rake angle or vice versa. One such grinder is disclosed in U.S. Pat. No. 4,136,585 to Lenard, assigned to Vollmer. Lenard discloses an automatic grinding machine with a carrier that tilts about an axis perpendicular to the plane of a saw blade. The carrier supports a carriage that swivels 180° so that the grinding surface of a grinding wheel mounted thereto can be positioned for either a positive or negative rake angle. The problem with this arrangement, however, is that changing the setting of the machine from positive to negative rake angle, or vice versa, is inefficient. An operator must first tilt the carrier, then he must swivel the carriage 180°, and finally he must invert the grinding wheel over so that the angled grinding surface is properly facing the saw tooth. These steps are labor intensive and require the grinding machine to be shut down for a considerable period.

In addition to the foregoing, during operation of the Lenard top and face grinder adverse vibrations are generated. We believe the vibrations arise because the carrier cantilevers from the tilting axis and because the motor that drives the grinding wheel is disposed at the farthest point from the tilting axis. Such vibrations have a detrimental effect on the precise replication required for grinding circular saw blades.

Therefore, there is a need for an improved top and face grinder that exhibits a high degree of flexibility and precise replication not achievable using conventional automatic top and face grinders.

SUMMARY OF THE INVENTION

One object of the present invention is to provide an improved top and face grinder.

A second object is to improve top and face grinding precision and uniformity.

Another object is to sequentially and precisely position the teeth of a circular saw blade uniformly in a predetermined grinding position.

Yet another object of the invention is to precisely index circular saw blades having widely varying diameters using simple automatic controls.

A further object of the invention is to grind the top and face of teeth having either positive and negative rake angles on circular saw blades without the user having to reconfigure the grinder.

Still another object is to reduce vibrations generated by the top and face grinder.

An additional object is to simplify reconfiguration of a top and face grinder for circular saw blades of different diameters and saw tooth rake angles.

The present invention is a grinding machine for separately grinding a plurality of toothed circular saw blades having widely varying diameters, e.g., from 4- inches to 4 feet in diameter. A housing assembly supports the components of the grinder. A saw holder is mounted on the housing to axially support a circular saw blade for rotation. The saw holder is adjustable in a predetermined direction of feed (e.g., horizontal) so that it can be repositioned for blades having different diameters. The saw blade is positioned at a radial distance from the grinding wheel so that, as the saw blade rotates, the saw teeth travel in an arcuate path that intersects a work point where the grinding operation occurs. A saw blade mounted on the saw holder is held in position for grinding by an elongated saw clamp assembly that is also mounted to the housing assembly. To lock the blade into position, the saw clamp frictionally engages the saw blade thereby locking the saw blade against rotation during the grinding process. The saw clamp assembly is angularly positioned so that it will not interfere with any other component of the grinding machine, particularly the head arm as discussed below. The teeth of the saw blade are ground by a grinding wheel that is part of a grinder head assembly. The grinder head assembly is supported by an elongated head arm. To allow the grinding wheel to engage and disengage the teeth of the saw blade, the grinder head assembly is shiftably guided on the head arm. In this way, the grinding wheel reciprocally moves back and forth from a retracted position to an extended grinding position. After the grinder head assembly has completed a grinding cycle, the saw blade is advanced by an indexer assembly so that the next tooth on the saw blade is positioned for grinding.

In a first aspect of the invention, the indexer assembly is pivotally mounted on the housing assembly and comprises a pawl that engages a tooth on the saw blade, and a cam follower that engages a cam plate rotatably mounted on the housing assembly. The cam follower moves relative to a selected one of a plurality of cam surfaces disposed around the periphery of the cam plate. This, in turn, causes the indexer to pivot. Thus, as the pawl hydraulically or pneumatically extends, the indexer pivots thereby causing the pawl to engage a tooth and advance it so that a preceding tooth will be advanced in position for grinding. When a saw blade of a different diameter is to be ground, the cam plate is easily and quickly rotated to select a different camming surface adapted to the blade diameter, and is locked in such position.

In a second aspect of the invention, the head arm is tiltable about a tilting axis oriented perpendicular relative to the plane of the saw blade. To allow for tilt, the head arm is pivotably mounted to the housing assembly. The head arm assembly tilts to an extent that allows the grinding wheel to be positioned to grind a tooth having either a positive or negative rake angle. The clamping assembly is positioned so that the head arm can be tilted to grind a negative rake angle without having to swivel the grinder head assembly and remount the grinding wheel. The grinder head assembly can be mounted on the head arm so that it can swivel about an axis perpendicular to the axis of tilt. To help stabilize the grinder head assembly, the grinder head is locked against swivel of more than 45° to either side of a center position.

A third aspect of the invention is that the housing assembly includes a head mounting plate to which the head arm is locked during operation. Preferably, the principal components of the grinder are mounted on this plate, which can be machined to precise tolerances and can be massive. This arrangement greatly reduces vibrations.

An advantage of the present invention is that the complexity of grinding machines is reduced thereby making such machines less expensive to manufacture.

A further advantage is that operation of the grinding machine requires less labor thereby reducing expenses related to operation.

Yet another advantage is that this design enables the grinder to be manufactured to close tolerances and to be configured and operated with precision and uniformity.

The foregoing and other objects, features, and advantages of this invention will become more readily apparent from the following detailed description of a preferred embodiment which proceeds with reference to the accompanying drawings.

BRIEF DESCRIPTION OF THE DRAWINGS

FIG. 3 is a slightly enlarged end elevation view of the grinder taken along line 3—3 in FIG. 1.

FIG. 10 is an enlarged front elevation view of the saw holder of FIG. 1.

FIG. 11 is a fragmentary top plan view of the saw holder taken along line 11—11 in FIG. 10.

FIG. 12 is an enlarged front view of the cam plate of FIG. 1.

FIG. 13 is a cross-sectional view of the cam plate taken along line 13—13 in FIG. 12.

DETAILED DESCRIPTION OF PREFERRED EMBODIMENT

Figure 1:
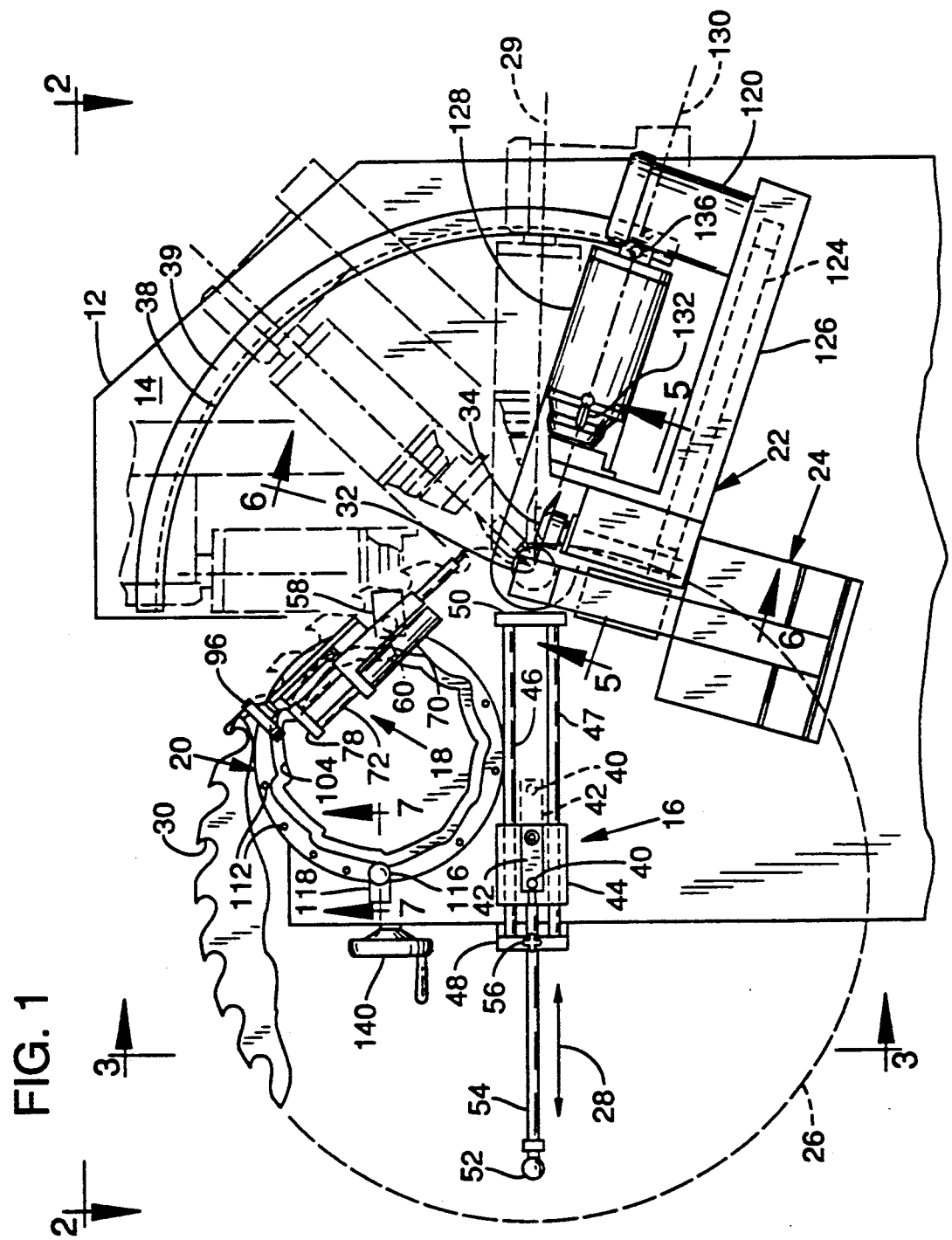
FIG. 1 is a front elevation view of a face and top grinder in accordance with the invention, with a circular saw blade and various positions of the grinder head assembly shown in phantom lines.

FIGS. 1 through 13 show a preferred embodiment of invention. The overall arrangement is first described with reference to FIGS. 1-4. Then, the various parts of the apparatus are described with reference to the corresponding drawing Figures.

Referring to FIGS. 1-4 a housing assembly 12, which includes a front surface 14, supports the major components of the face and top grinder 20. Supported thereon are a saw holder assembly 16, an indexer assembly 18, a rotatable indexer cam plate 20, a grinder head assembly 22, and a saw clamp assembly 24.

The saw holder assembly is arranged to mount a circular saw blade 26 for rotation and to be horizontally positionable, as indicated by arrow 28, to accommodate saw blades of different diameters. The rotational axis of the saw blade is aligned with a horizontal translational axis 29.

The indexer assembly is operable for indexing saw blade 26, one saw tooth 30 at a time, through a grinding position 32 on axis 29. The indexer cam plate 20 guides the indexer assembly during indexing so that the indexer follows the circumference of the blade along a prescribed arc extending through the grinding position. It is rotatably positioned to alter the arc to correspond to saw blades of different diameters.

After each saw tooth of saw blade 26 is indexed to its grinding position, the blade is restrained against further rotation and other movement by saw clamp assembly 24. The saw clamp assembly 24 is also mounted on the housing assembly 12 in a way that avoids interfering with operation of other top and face grinder components.

The grinding of the saw teeth is then accomplished by a grinding wheel 34 driven by grinder head assembly 22. The grinder head assembly 22 extends from a first or retracted position, in which wheel 34 is withdrawn from the saw blade, to a second or extended grinding position, which coincides with grinding position 32. After a saw tooth is ground, the grinding cycle is completed when the grinder head assembly 22 is retracted. This allows further indexing of the saw blade 26, i.e., an adjacent tooth is sequentially moved into grinding position 32.

To accommodate grinding of saw teeth having varying rake angles, the grinder head assembly 22 is attached to front surface 14 of the housing by means of a head arm subassembly 36 (in FIGS. 2, 3 and 6) which is pivotable about a tilt axis 37 (in FIG. 2) normal to the plane of blade 26 and coincidental with grinding position 32. Grinder head assembly 22 is shown in alternate positions about the tilt axis in dashed lines. Additionally, the head arm subassembly 36 is stabilized for precise grinding by having two mounting points on front surface 14: one point is on the tilt axis, and the other point is on a head mounting plate 39 and a lock guide 38, each of which is mounted on front surface 14. The head mounting plate 39 is made of a thick (e.g., 1-inch), massive sheet of steel and its front surface is machined flat. The principal subassemblies are thereby precision-mounted rigidly on plate 39. Any vibrations of grinding are effectively dampened in operation.

Considering now in more detail the structure of the components from which the top and face grinder 20 is assembled, saw blade 26, as seen in FIG. 1, is mounted on saw holder assembly 16. The saw holder assembly supports the saw blade and properly positions it relative to the other components of the grinder. In this way, as the saw blade is rotated between grinding operations, each tooth on the saw blade travels to the work point 32 where the grinding operation takes place.

Turning now to FIGS. 10 and 11, saw blade 26 is rotatably received by a holder bar 40 which is supported by a chuck block 42 to define the axis of rotation of the saw blade. The chuck block is removably mounted on a holder block 44. For horizontal movement in the direction of feed, the holder block 44 is slidably guided on a pair of guide rods 46, 47 which extend between a rear mounting block 48 and a front mounting block 50. Chuck block 42 can be removed, turned 180° along the longitudinal axis thereof and remounted in block 44 to accommodate heavier saw blades having larger diameters. To initiate movement of the saw blade 26 in the direction of feed, an operator grips a ball handle 52 which is connected to a push rod 54. In this way, an operator moves the push rod 54, which is connected to the holder block 44, in the horizontal direction of feed. When the operator achieves the proper horizontal positioning of the saw blade 26, the saw holder assembly is locked by turning a lock knob 56.

Turning again to FIG. 1, as preparation for grinding proceeds, indexer assembly 18, rotates the saw blade 26 so that each tooth on the saw blade is sequentially positioned and delivered to the work point 32 where grinding occurs.

Figure 8:
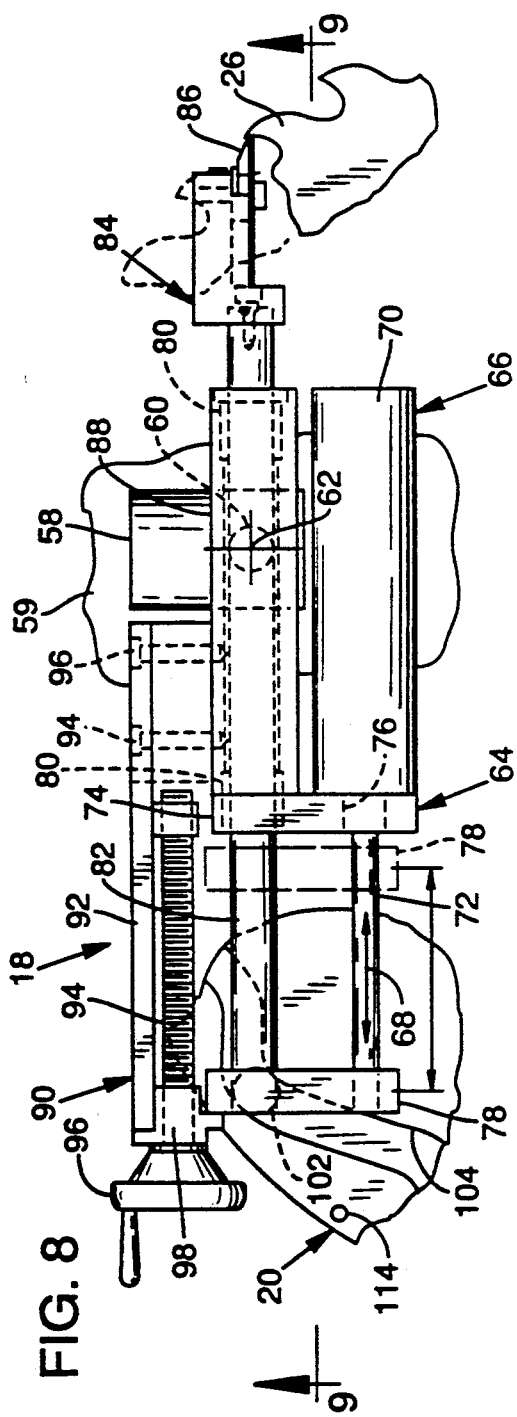
FIG. 8 is an enlarged front elevation view of the indexer assembly of FIG. 1.
Figure 9:
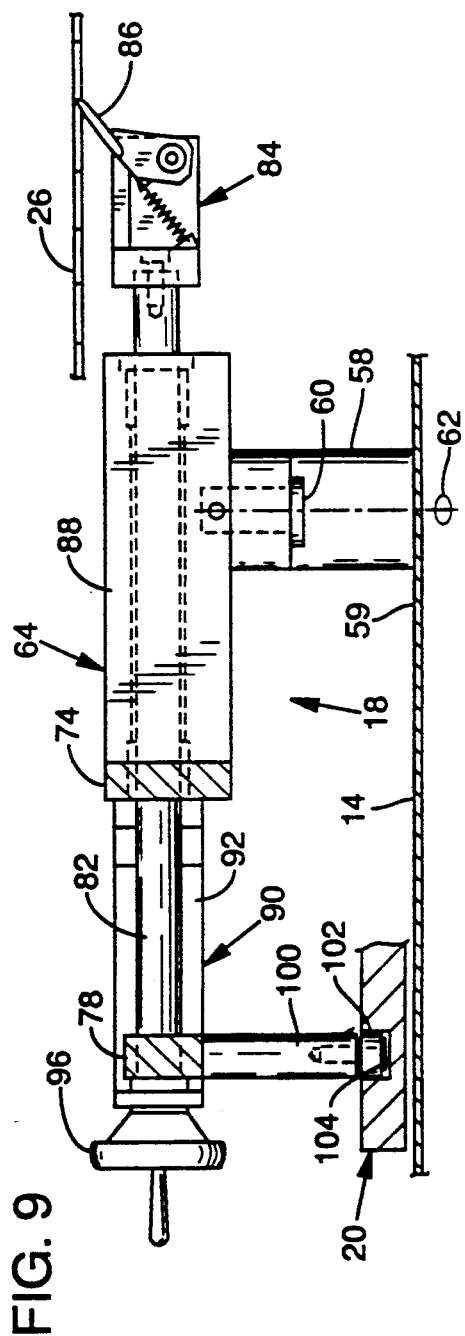
FIG. 9 is a fragmentary bottom plan view of the indexer assembly taken along line 9—9 in FIG. 8.

Turning now to FIGS. 8 and 9, consideration will now be given to a more detailed description of indexer assembly 18. The indexer assembly is mounted on a pivot block 58 which, in turn, is fixably mounted on a cam mounting plate 59, having an edge viewable in FIG. 2. A pivot pin 60 is pivotable in a bore formed in block 58 about a pivot axis 62. Pin 60 is fixed to a cylinder block subassembly 64.

Subassembly 64 includes a hydraulic or pneumatic ram 66 having a cylinder 70 and a rod 72. A plate 74 fixedly mounted on the left-most end of cylinder 70 includes a bore 76 through which rod 72 extends. Plate 74 includes an opening 80 in which an elongate indexing arm 82 is received. The outermost or distal end of rod 72 is fixedly attached to a second plate 78.

One end of arm 82 is mounted on plate 78. A pawl or index finger subassembly 84 is mounted on the other end of arm 82. Subassembly 84 includes a spring-loaded finger 86 for engaging the teeth on saw blade 26 one tooth at a time.

Cylinder block subassembly 64 further includes an indexing arm guide 88. The arm guide has an elongate opening therethrough in which arm 82 is slidably received. The left-most end of guide 88 is mounted on plate 74. Pivot pin 60 pivotally connects block 58 and guide 88.

A fence 90 includes a fence frame 92 which is rigidly mounted on guide 88 via screws 94, 96. A threaded rod 94 is constrained for rotation about the axis thereof on fence frame 92 immediately above indexing arm 82. One end of the threaded rod has a hand wheel 96 fixedly mounted thereon. A stop 98 includes a threaded bore therethrough with which rod 94 is threadably engaged. Rotation of hand wheel 96 causes stop 98 to be moved along the axis of rod 94. As can be seen in FIG. 8, when ram 66 is extended, plate 78 is urged against stop 98 which thus defines the left-most extent of travel of the plate. When ram 66 contracts, plate 78 assumes the position shown in dashed lines in FIG. 8.

A cam follower arm 100 is fixedly mounted on plate 78 and includes a round cam follower wheel 102 rotatably mounted on the free end thereof. As can best be seen in FIG. 9, cam follower wheel 102 is received in a groove 104 on cam plate 20. Groove 104 defines a series of internal camming surfaces extending end-to-end around the periphery of the cam plate.

Generally speaking, an operator rotates cam plate 20 to a position which is suitable for the diameter of saw blade 26. Hand wheel 96 is also adjusted to a predetermined position based on the diameter of the saw blade. Pivot pin 60 permits indexer assembly 18 to assume an orientation relative to saw blade 26 so that finger 86 engages the next adjacent tooth on the saw blade each time the ram contracts. The next tooth is thus rotated into grinding position 32.

Attention is now directed to FIGS. 12 and 13 for a more detailed description of cam plate 20. The cam plate comprises a round, flat plate made from a rigid material such as ASTM 36 steel and is machined on its flat axial faces to a uniform thickness. The cam plate is mounted on a hub 106 (in FIG. 3) for rotation about axis 108. Hub 106 is in turn mounted on mounting plate 59. Cam plate 20 includes a shaft 110 welded thereto which is received by hub 106. A central bore (not visible) in cam mounting plate 59 receives shaft 110 therethrough.

Groove 104 is formed by machining a closed loop series of arcuate groove segments 104A through 104L connected end-to-end around the periphery of plate 20. Each successive groove segment has a progressively increasing length and radius of curvature adapted to a specific saw diameter, for example as noted in FIG. 12. The curvature of each segment is arranged so that, when traced by the cam follower 102, the indexer assembly 18 is pivoted as the pawl 84 extends to cause the pawl to follow precisely the circumference of the corresponding diameter saw blade. Thus, groove segment 104A is short saw blade; segment 104A is long and shallowly curved for a saw blade of 48-inches in diameter.

In designing the indexer and cam plate, consideration must be given to the range of saw blade diameters to be ground and its effect on the positioning of indexer pivot 60 and the size of the cam plate. These determinations are influenced by the range of tooth spacings in each saw blade diameter to be ground and by the desirability to have the cam segments arranged to form a continuous, closed-loop series. The design of the indexing assembly thus involves a compromise between the overall size of the cam plate, positioning of the indexer pivot and the steepness of the cam segments both individually and at their end-to-end transitions.

The saw blade tooth spacing determines the length of stroke needed for the indexer. Although some blades may have a greater tooth spacing, we have selected a 4" maximum stroke length and ¼ minimum stroke length as sufficient to cover the vast majority of tooth spacings in saw blades in the preferred 4" to 48" diameter range.

Figure 2:
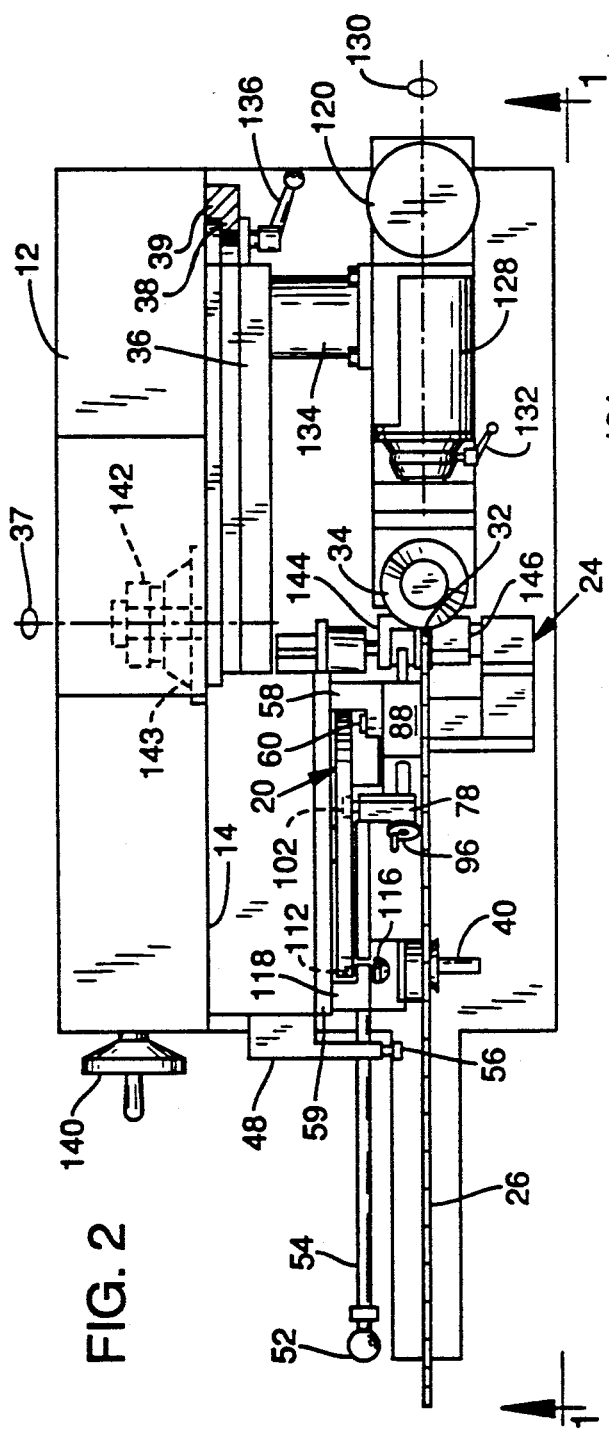
FIG. 2 is a top plan view of the grinder taken along line 2—2 in FIG. 1.

Preferably, as shown in FIGS. 1 and 2, the indexer pivot 60 is positioned approximately over the circumference of the cam plate. Under influence of the cam, the indexer behaves as a lever, the leverage of which is determined by the ratio of the distance between the pivot axis 62 and pawl end 86 and the distance between the pivot axis 62 and cam follower 102. This ratio determines the amount of transverse movement required to be imparted to the cam follower to cause the pawl to follow a given arc during indexing. This ratio decreases during each indexing stroke, which, together with the arc of each blade to be ground, determines the curvature required for each cam segment, and thus the steepness of the camming surfaces.

For purposes of determining cam plate size, however, it suffices to know the beginning or maximum ratio and the maximum tooth spacing for each blade size. We have chosen a 4" stroke for a maximum tooth spacing in blades of 16" diameter (13 teeth) and larger, a maximum stroke of 2" for the maximum tooth spacing in a 4" diameter blade (six teeth) and a 5" diameter blade (eight teeth), and intermediate stroke lengths for blade diameters between 5" and 16". When the indexer is retracted, the distance between the pivot axis 62 and pawl end 86 is 7-1/16" and the distance between the pivot axis 62 and cam follower 102 is 9-¼'.

To enable a user to smoothly rotate the cam plate from one cam segment to another, it is preferable to avoid having a retrograde transition portion between camming segments. Thus, the circumferential length of the series of cam segments, and any intervening transition portions, must be at least sufficient to include the sum of the lengths of all of the different segments needed for each saw blade size within a predetermined range. For example, for a range that encompasses 4 ∝ to 48" saw blades, we have found that a 7-½" diameter cam plate is sufficient to provide the requisite number and lengths of cam segments and transition portions. To expand the range of saw blade diameters that can be ground, the pivot 60 could be moved slightly closer to the pawl and the diameter of the cam plate increased to accommodate an added cam segment.

From the foregoing information, the lengths and shapes of each cam segment are routinely determined, for example, by graphically plotting them. The cam segments are then positioned around the cam plate, preferably in order of increasing blade diameter as shown in FIG. 12, so that their ends are sufficiently close together to be interconnected to form a continuous closed loop. This can be done effectively by positioning a common point, such as the endpoint, of each segment on a circle within the circumference of the plate.

The cam plate includes a plurality of bores therethrough, like bores 112, 114 located on a circle concentric with the axis 108 of cam plate 20 and adjacent the outer perimeter thereof. These bores are circumferentially spaced in successive correspondence with the lengths of the groove segments.

Figure 7:
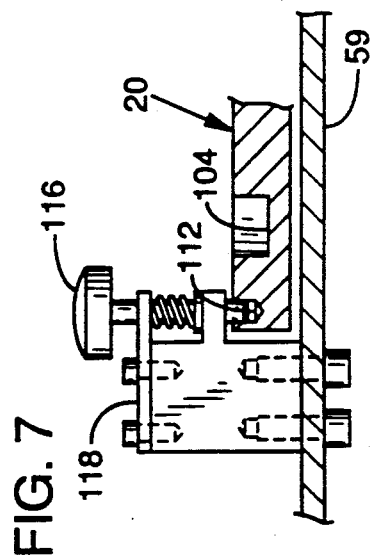
FIG. 7 is a cross-sectional view taken along line 7—7 in FIG. 1 showing details of the rotatable cam plate lock assembly.

As can be seen with reference to FIG. 7, a spring loaded pin 116 is fixedly mounted on a bracket 118 which is in turn fixedly mounted on cam mounting plate 59. Cam plate 20 may thus be fixed at one of a plurality of preselected radial positions by lifting upwardly on pin 116 (in the view of FIG. 7), rotating cam plate 20 until a selected one of the bores, like bore 112 for segment 104L, is located beneath pin 116 and allowing the pin to be biased into the bore. As later described in more detail, each of the bores, like bores 112, 114, positions cam plate 20 in an appropriate position for sharpening a saw blade with the angular position of the cam plate being set dependent upon the saw blade diameter.

Directing attention now to FIGS. 1, 2 and 6, further consideration will be given to the structure and operation of grinder head assembly 22. The grinder head assembly includes a grinder motor 120 which imparts rotary motion to grinder wheel 34 via a belt 124 contained in a spindle housing subassembly 126. A spindle rotator subassembly 128 is rotatable about an axis 130 through grinding point 32 and may be fixed in any one of an infinite number of selected positions between the dot-dash depictions of motor 120 in FIG. 6, e.g., a range of 45° each direction about a neutral position. The spindle rotator subassembly is fixed via a lock which is locked and unlocked by a handle 132.

Grinder head assembly 22 is mounted on head arm subassembly 36 via a shaft 134. As is best viewed in FIG. 1, head arm subassembly 36, and thus grinder head assembly 22, may be positioned anywhere between a first position in which axis 130 is vertical, shown in dashed lines in FIG. 1, and a second position in which axis 130 is 15° below the horizontal axis 29, shown in solid lines in FIG. 1. A lock carried on subassembly 36 and operated by a lock handle 136 (in FIG. 2) fixes head arm subassembly 36 to lock guide 38 at any selected position within the foregoing-described range of motion of the head arm subassembly.

Figure 4:
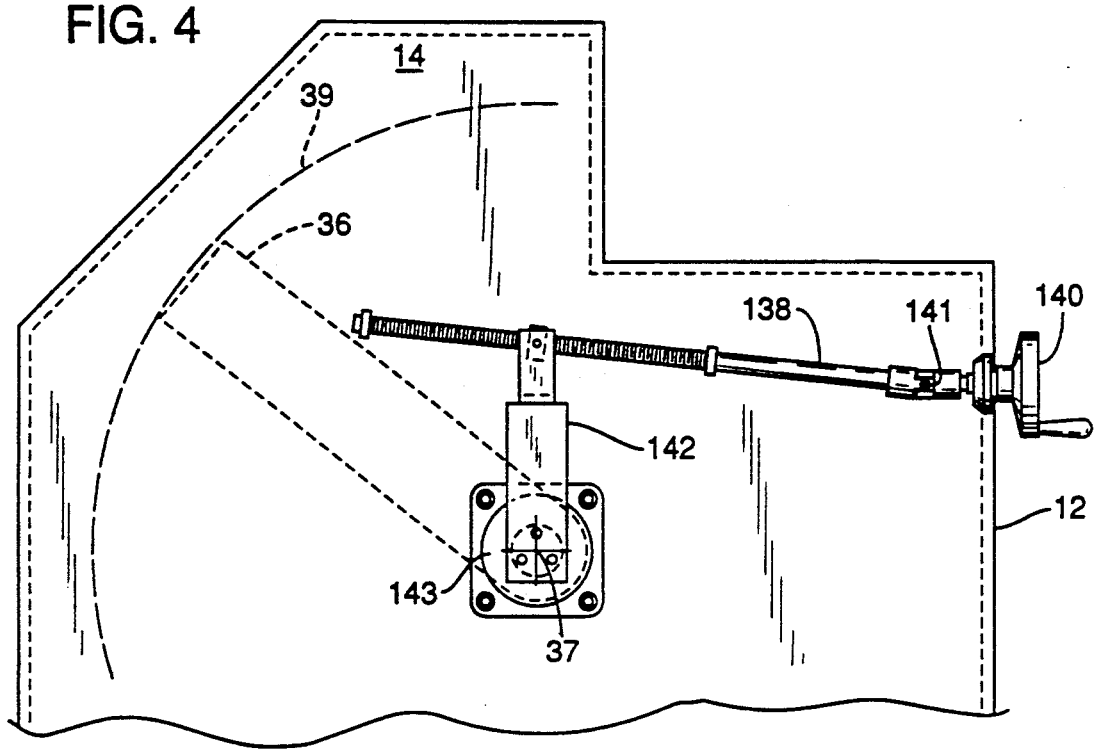
FIG. 4 is a rear elevation view of the grinder taken along line 4—4 in FIG. 3.
Figure 5:
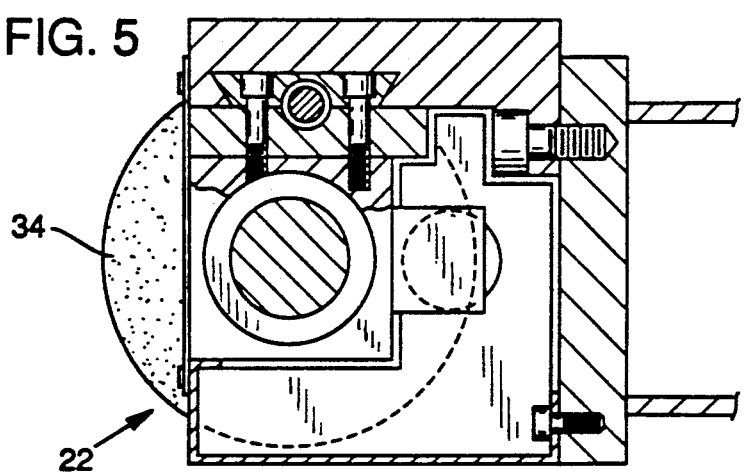
FIG. 5 is a cross-sectional view taken along line 5—5 in FIG. 1 showing details of the grinder head assembly.

Turning attention now to FIG. 4, consideration will be given to the manner in which head arm subassembly is moved when lock handle 136 is manipulated to unlock the head arm subassembly. A jack screw 138 is disposed between a hand wheel 140, which is mounted on housing assembly 12, and a hand linkage assembly 142 pivotably mounted on a hub 143. A universal joint 141 connects the hand wheel to screw 138. With head arm subassembly 136 unlocked, rotation of handle 140 pivots linkage assembly 142 on hub 143 and thus grinder head assembly 122 between the first and second positions described above. Hand wheel 140 is used to position head arm subassembly 36 dependent upon whether the teeth on a saw blade are being top ground or face ground, and dependent upon the angle of the face grind, as will be described in more detail hereinafter.

Saw clamp assembly 24 best viewed in FIG. 3, is conventional in structure and operation and includes a pair of opposed saw gripping members 144, 146. Members 144, 146 withdraw from the surface of saw blade 26 as the blade is being advanced by indexer assembly 18 and clamp blade as shown in FIG. 3 after blade advancement. Controls for so synchronizing the operation of indexer 18 and saw clamp assembly 24 may be built by a person having ordinary skill in the art.

The saw clamp assembly is mounted so that the head arm assembly 22 can be tilted below the horizontal axis 29 for grinding a negative rake angle without having to invert the spindle housing subassembly 126 and grinding wheel 34. Thus, the saw clamp assembly is mounted at an obtuse angle, preferably at least 105° toward the saw blade from axis 29, but not so far as to interfere with a saw blade of large diameter.

OPERATION

In operation, a saw blade 26 is mounted on holder bar 40 of saw holder assembly 16 and handle 52 is used to position the saw blade so that the teeth thereof are located at grinding position 32. With the blade so positioned, lock knob 56 is turned to lock push rod 54, thus preventing additional lateral movement of the saw blade.

Next, the angular position of cam plate 20 is adjusted by releasing spring-loaded pin 116 and rotating the plate. Each of the angular positions in which the spring-loaded pin is received in one of the cam plate bores, like bores 112, 114, corresponds to a different diameter saw blade. Thus, the angular position corresponding to the diameter of the saw blade mounted on saw holder assembly 16 is selected.

Hand wheel 96 (in FIG. 8) is used to set the position of stop 98 on rod 94. The position of stop 98 on the rod is determined by the distance between saw teeth on the blade. For saw blades having longer spaces between adjacent saw teeth, which are typically larger-diameter blades, stop 98 is set toward the left end of rod 94 to permit index finger subassembly 84 to travel to the left (in FIG. 8) a sufficient distance to engage the next saw tooth. For saw blades having relatively short arc between adjacent saw teeth, stop 98 is set to the right on rod 94 so that index finger subassembly 84 moves to engage the next adjacent saw tooth, and no further, when rod 70 is extended so that plate 78 abuts stop 98.

Hand wheel 140, in FIGS. 2 and 4, is adjusted to select the desired tilt angle of head arm subassembly 36, and thus the angle of grinder 34 relative to each saw tooth. For top grinding, subassembly 36 is positioned at an angle of zero degrees relative to the vertical axis through grinding position 32. The configuration for head arm subassembly 36, and thus spindle rotator subassembly 128, is shown in dashed lines in FIG. 1.

For face grinding saw teeth, subassembly 36 is positioned at the appropriate tooth angle. It should be noted that the range of motion of subassembly 36 permits grinding a positive, neutral (axis 29) or negative face angle on the saw teeth. This is achieved without rotating spindle rotator subassembly 128 180° and without turning over wheel 34.

Figure 6:
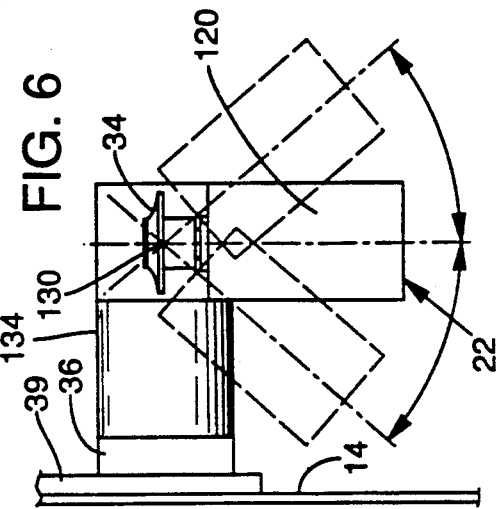
FIG. 6 is a view taken along line 6—6 in FIG. 1 showing swiveling of the grinder head assembly.

Spindle rotator subassembly 128 and, thus, grinding wheel 34 are adjustable about the axis 130 of subassembly 128 as shown in FIG. 6 for swiveling grinding wheel 34 about axis 130 as desired.

After mounting blade 26 on grinder 10 and adjusting the same as described above, the grinder is actuated to operate under electrical and hydraulic controls which can be readily implemented by a person having ordinary skill in the art. The controls cause indexer assembly 18 to advance the wheel one saw tooth at a time so that grinding by wheel 34 occurs at grinding position 32 for each saw tooth. The shape of groove 104 on cam wheel 20 covers cam follower 102, and thus finger 86, to trace an arcuate path suitable for the diameter of the blade being sharpened.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A grinding machine for sharpening toothed circular saw blades of widely varying sizes, the grinding machine comprising:
    a housing assembly;
    a saw holding mounted on said housing assembly to support a saw blade;
    an elongated head arm having a first end and a second end, the first end being mounted on said housing assembly for pivoting about a tilting axis oriented perpendicular relative to the plane of said saw blade;
    a grinder head assembly shiftably guided on said head arm for reciprocal movement toward and away from the blade along a swiveling axis lying in the plane of said saw blade and intersecting said tilting axis; and
    a head mounting plate fixedly mounted to said housing assembly wherein the second end of said head arm is slidingly received by said head mounting plate thereby providing at least two points of support for said head arm.

2. A grinding machine as recited in claim 1 wherein said grinder head assembly is mounted in swivel relation to said head arm, said grinder head assembly being pivotable relative to said head arm about said swiveling axis.

3. A grinding machine as recited in claim 1 wherein the head arm includes a locking means disposed on said head arm to engage said head mounting plate at a plurality of locations for selectively locking said head arm relative to said head mounting plate.

4. A grinding machine as recited in claim 3 wherein the head mounting plate includes a shoulder disposed to engage said locking means.

5. A grinding machine as recited in claim 3 wherein the head mounting plate includes a groove disposed to engagingly receive said locking means.

6. A grinding machine as recited in claim 1 wherein the head mounting plate is formed with sufficient mass to dampen vibrations of grinding.

7. A grinding machine for sharpening toothed circular saw blades of widely varying sizes, the grinding machine comprising:
a housing assembly;
a saw holder mounted on said housing to support a saw blade wherein said saw holder is adjustable in a direction of feed to position saw blades of a diameter range having a minimum and a maximum diameter for grinding of the saw teeth at a fixed grinding position;
a head arm mounted on said housing assembly for rotation about a tilting axis oriented perpendicular relative to the plane of said saw blade;
a way housing shiftably guided on said head arm for reciprocal movement toward and away from the blade along a swiveling axis lying in the plane of said saw blade and intersecting said tilting axis;
a spindle housing mounted in swivel relation on said way housing;
a spindle rotator journaled on said spindle housing, the axis of said spindle rotator intersecting said swiveling axis; and
a grinding wheel mounted to said spindle rotator;
said head arm being rotatable in a range of at least 120° about said tilting axis, said tilting range lying on both sides of a neutral position in which the spindle rotator axis is disposed perpendicular to the direction of feed; and
an elongated saw clamp assembly mounted to said housing assembly to frictionally engage said saw blade, said saw clamp assembly disposed relative to said spindle housing to prevent contact therebetween.

8. A grinding machine as recited in claim 7 wherein the saw clamp is positioned at an obtuse angle relative to said direction of feed, away from the head arm so that swivel axis can be positioned at a negative angle relative to the direction of feed while the spindle housing is depending below the way housing.

9. A grinding machine as recited in claim 8 in which the obtuse angle is at least 105° and the negative angle is at least 15°.

10. A grinding machine as recited in claim 7 in which the saw clamp depends from the housing at a position adjacent but not contacting a saw blade of said maximum diameter and at an obtuse angle relative to said direction of feed, away from the head arm so that the head arm can be positioned throughout an angular range of tilt angles for grinding positive, neutral and negative rake angles on the saw teeth while swiveling the spindle housing by no more than 90° about a neutral swivel angle.

11. A grinding machine for sharpening toothed circular saw blades of widely varying sizes, the grinding machine comprising:
a housing assembly;
a saw holder mounted on said housing assembly to adjustably support a saw blade for positioning a circumferential saw tooth at a fixed grinding position;
a grinder head assembly shiftably guided on a head arm for reciprocal movement toward and away from the blade along an axis lying in the plane of said saw blade and intersecting said grinding position;
indexing means including a pawl reciprocable between first and second positions for advancing each saw tooth successively to said grinding position and pivot means permitting the index means to pivot transversely of the reciprocation thereof;
a cam follower mounted on the indexing means; and
a cam plate coupled to the cam follower for pivoting the indexing means, the cam plate having a plurality of camming surface segments connected end-to-end in series, each camming surface segment adapted to a corresponding diameter saw blade, so that the manner of pivoting the indexing means is varied by moving the cam plate to select one of the camming surface segments to control the cam follower.

12. A grinding machine as recited in claim 11 in which the camming plate is mounted for rotation and the camming surface segments are arranged in a circular series.

13. A grinding machine as recited in claim 12 in which the series of camming surface segments are connected to form a closed loop.

14. A grinding machine as recited in claim 12 in which the series of camming surface segments is ordered in accordance with radius of curvature.

15. A grinding machine as recited in claim 12 including releasable locking means for locking the camming plate in a selected one of a plurality of angular positions to select a corresponding one of the camming surface segments.

16. A grinding machine as recited in claim 11 in which the saw holder is adjustable to support and position saw blades having a plurality of diameters within a range between a minimum and a maximum diameter and the series of camming surface segments includes a first segment adapted to said minimum diameter, a second segment adapted to said maximum diameter.

17. A grinding machine as recited in claim 16 in which the saw holder is adjustable over a range which includes a 4-inch diameter saw blade and a 48-inch diameter saw blade.

18. A grinding machine as recited in claim 11 in which the camming surface segments are formed by a continuous groove in a face of the camming plate and the cam follower includes means defining a bearing surface for contacting and following the groove.

19. A grinding machine as recited in claim 10 in which each of the camming surface segments formed by said groove is interconnected by a transition portion which permits the cam follower to move continuously from one segment to another when the cam plate is moved.

20. A grinding machine as recited in claim 19 in which the cam plate is mounted for rotation and the camming surface segments and transition portions are arranged and interconnected to form a continuous closed loop.

21. A grinding machine as recited in claim 20 in which each of the camming surface segments is sized to a length at least equal to a maximum circumferential tooth spacing of the corresponding diameter saw blade.

22. A grinding machine as recited in claim 20 in which each of the camming surface segments is positioned so that a common point of each segment intersects a circle on the cam plate.

23. A grinding machine as recited in claim 20 in which the cam plate is sized to a circumference greater than a total circumferential length of the camming surface segments and transition portions.

24. A grinding machine as recited in claim 23 in which the pivot means is positioned along the indexing means between the cam follower and the pawl approximately over the circumference of the cam plate.

25. A grinding machine as recited in claim 13 in which each of the camming surface segments is positioned so that a common point of each segment intersects a circle on the cam plate.

26. A grinding machine as recited in claim 13 in which the pivot means is positioned along the indexing means between the cam follower and the pawl at a radius from an axis of rotation of the cam plate defining a circumference which surrounds the camming segments.

* * * * *

UNITED STATES PATENT AND TRADEMARK OFFICE
CERTIFICATE OF CORRECTION

PATENT NO. : 5,078,029
DATED : January 7, 1992
INVENTOR(S) : Boggs et al.

It is certified that error appears in the above-identified patent and that said Letters Patent is hereby corrected as shown below:

Column 4   Line 49, after "embodiment of" insert --a top and face grinder 10 in accordance with the--.

Column 7   Line 19, after "short" insert --and curved about a small radius for a 4-inch diameter--;

Line 37, change "1/2" to --1/2"--;

Line 65, change "9-1/4" to --9-1/4"--.

Column 8   Line 6, change "4∝ " to --4"--;

Line 7, change "7-1/2" to --17-1/2"--.

Column 10   Line 38, change "holding" to --holder--.

UNITED STATES PATENT AND TRADEMARK OFFICE
CERTIFICATE OF CORRECTION

PATENT NO. : 5,078,029
DATED : January 7, 1992
INVENTOR(S) : Boggs et al.

It is certified that error appears in the above-identified patent and that said Letters Patent is hereby corrected as shown below:

Column 11  Line 45, change "depending" to --depended--.

Column 12  Line 50, change "claim 10" to --claim 18--.

Signed and Sealed this

Fifteenth Day of June, 1993

Attest:

MICHAEL K. KIRK

Attesting Officer

Acting Commissioner of Patents and Trademarks